United States Patent [19]

Aleshire

[11] Patent Number: 4,822,005

[45] Date of Patent: Apr. 18, 1989

[54] CABLE PULLING SYSTEM AND ADAPTOR

[75] Inventor: Ronald E. Aleshire, Miami, Fla.

[73] Assignee: FPL Qualtec, Inc., Palm Beach Gardens, Fla.

[21] Appl. No.: 205,630

[22] Filed: Jun. 8, 1988

Related U.S. Application Data

[63] Continuation of Ser. No. 10,230, Feb. 3, 1987, abandoned, which is a continuation-in-part of Ser. No. 787,988, Oct. 16, 1985, abandoned.

[51] Int. Cl.$^4$ .............................................. B65H 59/00
[52] U.S. Cl. ................................................... 254/134.4
[58] Field of Search ................... 254/134.3 FT, 134.4, 254/134.3 R

[56] References Cited

U.S. PATENT DOCUMENTS 2,838,280  6/1958  Eyles .................. 254/134.3 FT
4,202,530  5/1980  Conti .................. 254/134.3 FT Primary Examiner—Frederick R. Schmidt
Assistant Examiner—Judy J. Hartman
Attorney, Agent, or Firm—Amster, Rothstein & Ebenstein

[57] ABSTRACT

A cable-pulling system for moving a cable through a conduit includes a birdie connected to the cable and formed to be located within the conduit, to be movable through the conduit and to create a fluid seal within the conduit. A supply of high-pressure/low-volume pressurized fluid is connected to one end of the conduit to create a pressurized region behind the birdie to urge the birdie to move to the opposite end of the conduit. Cable is supplied to permit the movement of the birdie through the conduit; however, the cable is supplied only in response to the existence of the pressurized region, and upon loss of the presurized region the cable is no longer supplied and movement of the birdie is prevented.

16 Claims, 6 Drawing Sheets

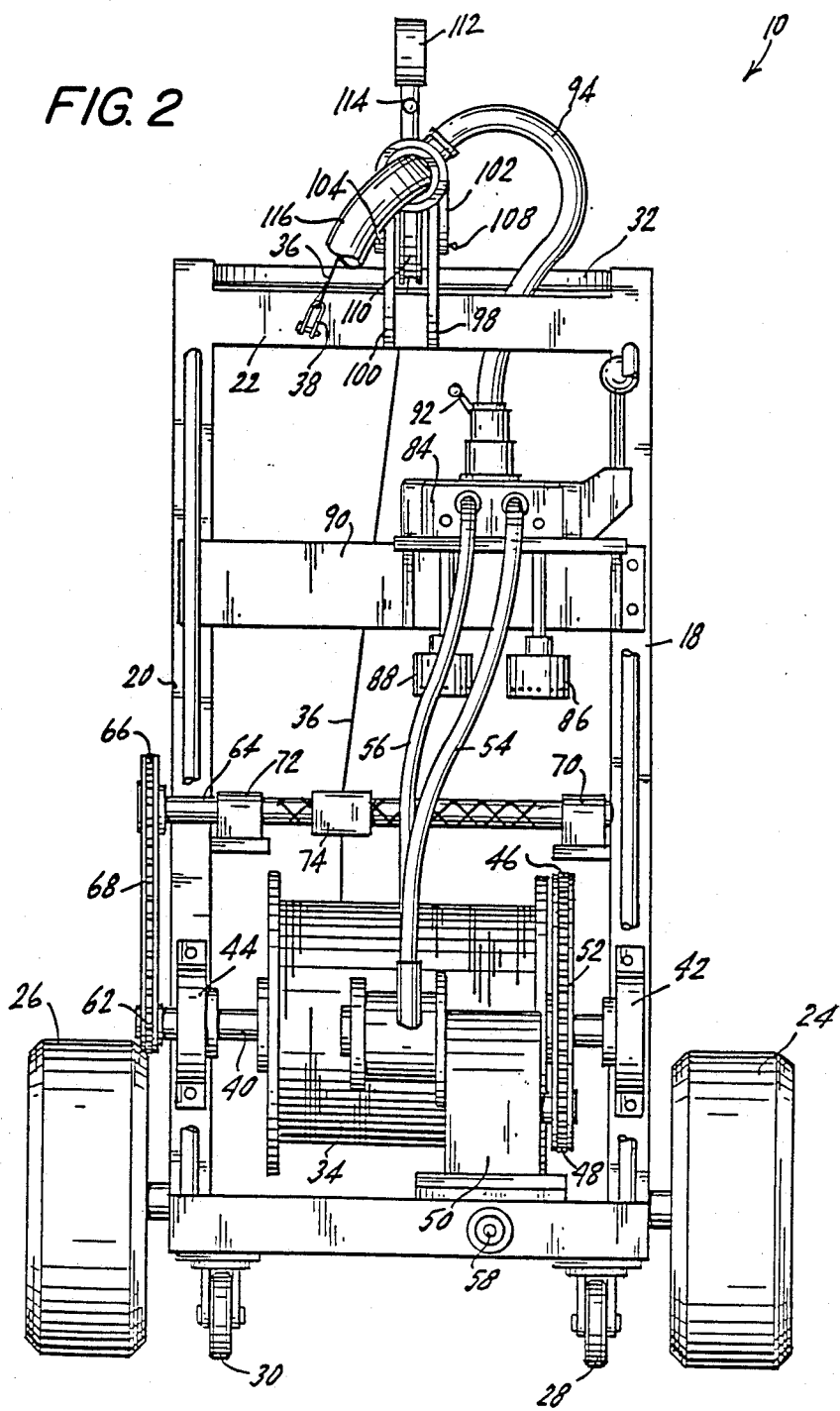

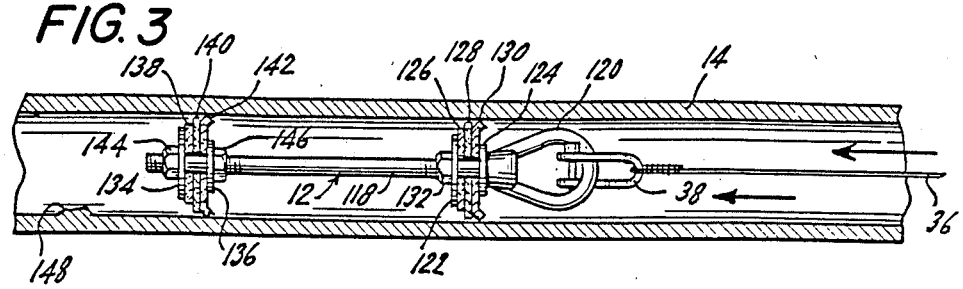
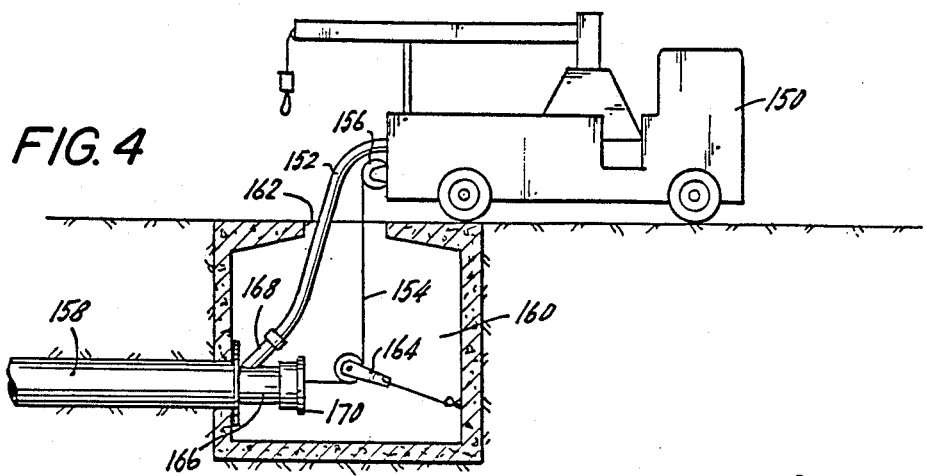
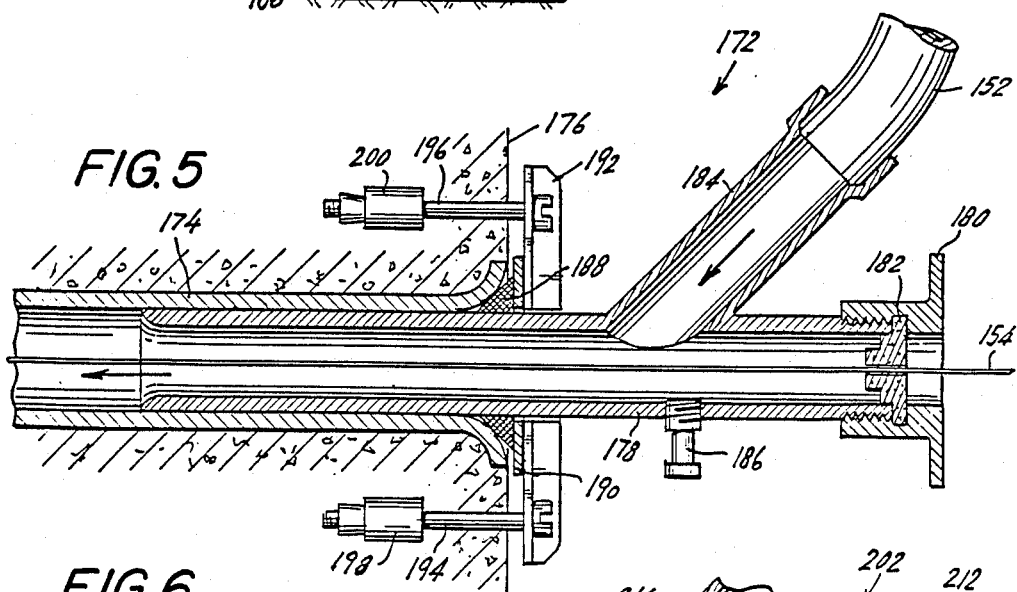
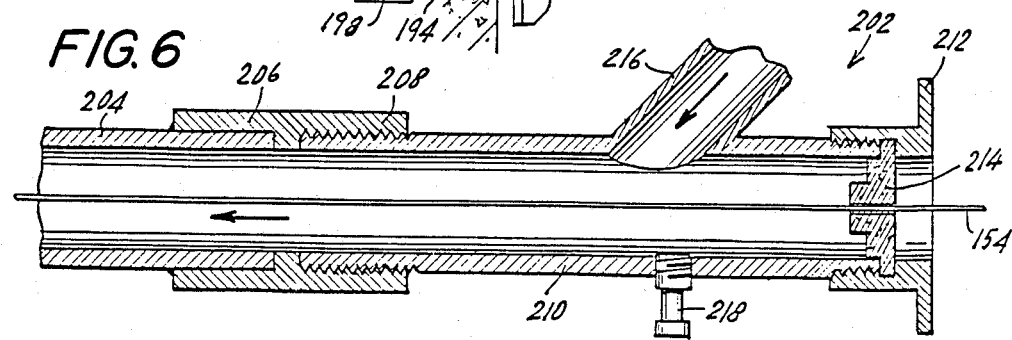

CABLE PULLING SYSTEM AND ADAPTOR

This is a continuation of co-pending application Ser. No. 010,230 filed on Feb. 3, 1987 which is itself a continuation-in-part of co-pending application Ser. No. 787,988 filed on Oct. 16, 1985, both now abandoned.

The invention relates to a system for inserting cable into a conduit and more particularly to an air powered cable pulling system and adaptor.

The increased use of underground cable (e.g. telephone, electric and other utility cables) contained in buried conduit requires improved methods of moving the cable through sections of conduit which often exceed 1000 feet in length. Presently, this is accomplished by blowinq a lightweight guide line through the conduit using compressed air. The guide line is then used to pull a heavier-weiqht line which in turn is used to pull heavier rope which is then used to pull the actual cable through the conduit. This multistep process takes considerable effort and time. Typical installations require a four-man crew to work about two hours to pull a single primary cable through a 2" diameter conduit 600 feet in length. In addition, work is frequently delayed due to breaking of the guide lines and the damaging of sections of the conduit.

In response to the need for improved cable pulling equipment, two types of alternative equipment have been developed over the past several years. While these two types of equipment constitute an improvement over the installation method described above, they are expensive, require specially trained operators and cannot be used in relatively inaccessible locations, e.g., underground vaults, electrical rooms and back yards. Specifically, in one type, a rodding machine is mounted on a truck or trailer and is used to push a $\frac{3}{8}$" or $\frac{1}{2}$" spring steel rod through a section of conduit while rotating the rod at a low rate of speed. Normal payout of the rod is about 40 to 50 inches per minute. Upon reaching the end of the conduit, the electrical or communications cable is attached to the rod which is then pulled back throuqh the conduit.

While this rodding type of equipment is useful in situations involving badly blistered or collapsed conduit, it incorporates the following severe disadvantages:
1. A long set up time (15 to 30 minutes) is required;
2. Communication between the operator and the reel tender is necessary for safe operation, in order to insure that the rod is stopped when it clears the receiving end of the conduit;
3. The payout of the rod is relatively slow;
4. The equipment cannot be used on conduit runs containing 24" radius 90° bends;
5. The equipment cannot be used in relatively inaccessible areas;
6. A specially trained operator is required, thereby limiting productivity and scheduling; and
7. The equipment is extremely expensive.

In a second type of cable pulling equipment, a high-volume/low pressure air blower, mounted on a trailer, is used to blow a plug like device (referred to as a "birdie") through a conduit by the use of compressed air, with the birdie carrying one end of a steel guide line through the conduit. The steel guide line extends from a drum which is mounted for free rotation so as not to impede the progress of the birdie through the conduit. Once the birdie passes through the length of the conduit, the steel guide line is attached to the electrical or communications cable and pulled back through the conduit using a hydraulic powered winch drum.

The disadvantaqes of this type of equipment include the following:
1. The uncontrolled payout (unwinding) of the steel guideline (frequently at a rate of over 1000 feet per minute) creates severe potential safety problems;
2. A specially trained operator is required;
3. The birdie cannot be blown throuqh partially collapsed sections of conduit;
4. Because the equipment is mounted on a trailer, it cannot be used in relatively inaccessible areas; and
5 The equipment is extremely expensive.

Of the above disadvantages, perhaps the most severe is the uncontrolled unwinding of the steel guide line and therefore uncontrolled movement of the birdie through the conduit. In essence, the system operates as a compressed air gun which "shoots" the birdie through the conduit. The birdie exits the opposite end of the conduit at a high velocity and can cause severe damage. The safe operation of this system is dependent on the operator's ability to stop the freewheeling drum when the birdie exits the conduit and, as such, is especially sensitive to operator error.

U.S. Pat. No. 4,030,702 issued to Ware et al. describes a cable pulling system for use with multi-passage conduit. The system employs a brake to keep multiple carriers (birdies) in phase as they move through the multi-passage conduit. Should one carrier lag behind the others, an operator can utilize the brake to retard the tension on the lines attached to the carriers to slow down the carriers so as to permit the lagqing carrier to catch up.

U.S. Pat. No. 4,030,702 is representative of the second type of cable-pulling equipment described above, specifically a high volume/low-pressure air blower which "shoots" the birdie through the conduit. The system described in the patent utilizes air compressors capable of deliverinq about 250 cubic feet per minute ("cfm"), a relatively high volume of compressed air, in order to drive the carriers through the conduit. This high volume of compressed air is delivered to the conduit at a relatively low pressure of 3.0 to 3.5 pounds per square inch ("psi") Since this system operates as a compressed air gun which "shoots" the birdies or carriers through the conduits it is therefore dependent on an operator's ability to utilize the brake to stop the carriers once they exit the conduit. Accordingly, the safe operation of this system is especially sensitive to operator error.

Accordingly, it is an object of the present invention to provide an improved cable pulling system which overcomes the defects inherent in prior art systems.

Another object of the present invention is to provide a cable pulling system which utilizes a relatively low-volume/high-pressure supply of compressed air to move a birdie through a conduit in a controlled and safe manner.

Still another object of the present invention is to provide a cable pulling system the operation of which results in a substantial savings of labor as compared to the operation of prior art devices.

A further object of the present invention is to provide a cable pulling system which is safer than prior art systems.

A still further object of the present invention is to provide a cable pulling system which may be quickly assembled, used and disassembled.

An additional object of the present invention is to provide a cable pulling system which is simple to operate and does not require a specially trained operator.

An additional object of the present invention is to provide an adaptor permitting use of the cable pulling system of the present invention with any standard air compressor and winch.

An additional object of the present invention is to provide an adaptor permitting use of the cable pulling system of the present invention with various different sized conduits.

These and other objects are achieved, in accordance with the present invention, by moving a birdie connected to a supply of cable through a length of conduit with the birdie being formed so as to create a fluid seal within the conduit. High pressure/low volume pressurized fluid (such as air) is introduced to a first end of the conduit so as to create a pressurized region within the conduit between the first end and the birdie, thereby urging the birdie through the conduit and to the opposite end thereof. Movement of the birdie is restricted, however, by the cable which is spooled out only in response to the existence of a threshold pressure in the region of the conduit between the first end and the birdie. Once the birdie exits the opposite end of the conduit, pressurization is lost, the cable is no longer spooled out and movement of the birdie is effectively stopped. As such, a controlled movement of the birdie through the conduit is achieved.

An additional feature of the present invention is an adaptor which is formed of a plug shaped to conform to the interior region of the conduit and having an internal face which is placed wholly within the conduit and an external face which remains outside the conduit A seal located adjacent to the internal face of the plug provides a fluid seal between the plug and the interior region of the conduit An air duct and a cable groove extend through the plug from the external face to the internal face and through the seal permitting the supply of pressurized fluid and cable to the interior region of the conduit. The plug may be expanded within the conduit so as to secure it in place within the conduit.

The above brief description as well as further objectives, features and advantages of the present invention will be more fully understood by reference to the following detailed description of the presently preferred, but nonetheless illustrative embodiments in accordance with the present invention, when taken in conjunction with the accompanying drawings, wherein:

FIG. 2 is a fragmentary front elevation of he cable pulling system of the present invention;

FIG. 3 is a sectional side elevation of the birdie used in the cable-pulling system of the present invention located within a portion of conduit;

FIG. 4 is a fragmentary sectional side elevation of an alternate embodiment of the present invention shown during operation thereof;

FIG. 5 is a fragmentary sectional side elevation of the portion of the cable-pulling system which is connected to the conduit;

FIG. 6 is a fragmentary sectional side elevation of an alternate embodiment of the portion of the cable-pulling system which is connected to the conduit;

Figure 1:
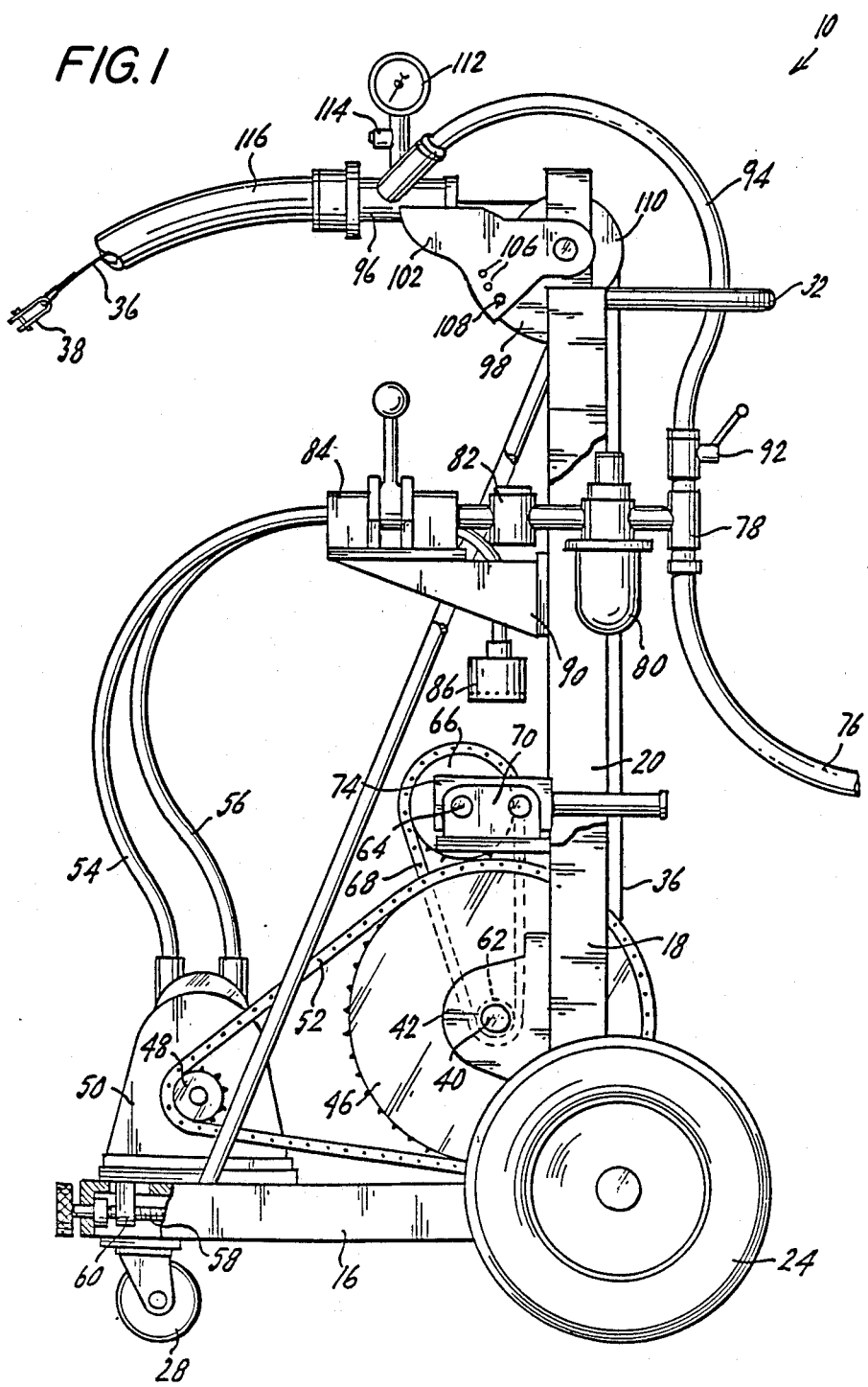
FIG. 1 is a fragmentary side elevation of the cable pulling system of the present invention.

Referring now to FIGS. 1-3, the cable pulling system of the present invention may take the form of the portable unit shown in FIGS. 1 and 2 and indicated qenerally by the reference numeral 10. The system also includes a birdie 12 which is shown in FIG. 3 moving through a section of conduit 14. The portable unit 10 includes an L-shaped dolly formed from a horizontal platform 16 and vertical uprights 18 and 20 connected at their upper ends by a cross bar 22. Preferably, the platform 16 and uprights 18 and 20 are formed of steel and welded together. In order to facilitate mobility of the unit 10, platform 16 supports a pair of wheels 24 and 26, which are located proximate to respective uprights 18 and 20 and a pair of remote casters 28 and 30. In addition, a handle 32 extends between the upper ends of uprights 18 and 20. The use of the wheels 24 and 26 and casters 28 and 30 permits the unit 10 to stand upright and be maneuvered in small areas, such as transformer rooms. In addition, the unit 10 may be operated as a hand truck by tilting the unit back on wheels 24 and 26, thereby allowing the unit to be quickly moved over substantial distances.

A drum 34 mounted on unit 10 carries a supply of cable 36, preferably steel wire rope, one end of which is secured to the birdie 12 by use of a connector or clip 38. During operation of the cable pulling system the birdie 12 is urged through the conduit 14 pulling the cable 36 therethrough and pay out or unwindinq of the cable 36 from the drum is regulated in order to control the movement of the birdie 12 Specifically, the drum 34 is carried on an axle 40 which is rotatably supported on the unit 10 in a pair of bearings 42 and 44 mounted on respective uprights 18 and 20. Movement of the axle 40, and therefore movement of the drum 34, is controlled by a gear 46 mounted on the axle 40 and driven by the output gear 48 of a pneumatic motor 50 through a chain 52. As such, the winding and unwindinq of the cable 36 from the drum 34 is achieved by operation of the pneumatic motor 50 which is controlled by the introduction of compressed air through tubes 54 and 56. The motor 50 may be formed with an internal rotor (not shown) which is driven by compressed air and which in turn drives output gear 58 throuqh a suitable gear reducer. A four horsepower air powered gear motor which would pay out cable at 100 feet per minute is contemplated for use in 2" and 4" diameter conduit no greater than 700 feet in length. For 4", 5" and 6" diameter conduit a 4 HP air powered gear motor which would payout cable at 50 feet per minute (the lower gearing would provide increased pulling power) is contemplated.

The motor 50 is constructed so that if pressurized air is supplied to the motor through tube 54, output gear 48 is driven to cause counterclockwise movement of the drum 34 and unwinding of the cable 36. Conversely, pressurized air supplied to the motor 50 throuqh tube 56 results in clockwise movement of the drum 34 and rewinding of the cable 36 thereon. If pressurized air is not supplied to the motor 50 through either tubes 54 or 56, the motor 50 will act as a brake with respect to the drum 34 to prevent either the windinq or unwinding of the cable 36.

As best seen in FIG. 1, adjustment of the tension of the chain 52 is accomplished by rotation of a lead screw 58 which is mounted on the platform 16. Rotation of the lead screw 58 results in movement of the motor 50 through a connector 60. As best seen in FIG. 2, in order to insure even winding and unwinding of the cable 36 across the drum 34, the drum axle 40 carries a gear 62 which is adapted to drive a rod 64 through a gear 66 which is secured to one end of the rod 64 and driven by a chain 68. Rod 64 is mounted for rotation in bearings 70 and 72, which are secured to respective uprights 14 and 16, and carries a cable guide 74. Rod 64 is threaded so that upon rotation quide 74 is moved back and forth along the rod so as to evenly wind and unwind the cable 36 from the drum 34.

An air compressor, not shown, is used to provide the pressurized air necessary for operating the motor 50 and, as will be described below, for moving the cable 36 through the conduit 14. The air compressor may be any standard unit capable of providing high-pressure/low-volume pressurized air, and compressors having an output of 150 to 175 CFM are preferred. The compressor supplies pressurized air to the system through a main supply line 76 which is secured to a T-connector 78 which forms part of the unit 10. One outlet of connector 78 supplies air to the tubes 54 and 56 through an air filter and regulator 80, an oil lubricator 82 and a motor control valve 84. Valve 84 permits air pressure to be supplied to tubes 54 and 56 to permit winding and unwinding of the cable 36. Mufflers 86 and 88 are provided for respective tubes 54 and 56 through which the respective tubes 54 and 56 exhaust to the atmosphere when not supplying air to the motor 50. For example, when valve 84 is operated to supply pressurized air to the motor 50 through line 54 in order to permit unwinding of the cable 36, tube 56 and muffler 88 serve as the exhaust for the motor. Similarly, when valve 84 is operated to supply pressurized air through tube 56 to operate the motor 50 to rewind the cable, tube 54 and muffler 86 serve as the exhaust for the motor. The valve 84 as well as the lubricator 82 and air filter and regulator 80 are carried on a shelf bracket 90 which extends between and is connected to uprights 18 and 20.

The other outlet of T-connector 78 provides air through an on/off valve 92 and a tube 94 to a pressurized air/cable junction assembly 96. Assembly 96 is adjustably connected to crossbar 22 throuqh the use of a pair of shoulders 98 and 100 which extend upwardly from the crossbar 22 and which rotatably support a pair of arms 102 and 104 which are secured to opposite sides of assembly 96. Both the arms 102 and 104 and shoulders 98 and 100 are formed with corresponding openings 106 wherby the angular orientation of the assembly 96 may be fixed by the insertion of a pin 108 through the corresponding openings. Shoulders 98 and 100 also rotatably support a pulley 110 which serves as a guide for the cable 36. Arms 102 and 104 may support a lineal footage counter, not shown, in the region proximate to the pulley 110 for monitoring the amount of cable unwound from the drum 34.

Assembly 96 includes a pressure gauge 112 and an air pressure escape valve 114 which serves as a safety feature by preventing extreme pressure build-up in the system. The cable 36 extends from the pulley 110 and enters the assembly 96 at one end through an airtiqht openinq. A conduit extension tube 116 is secured to the opposite end of the assembly 96 and is adapted to supply both pressurized air and cable to the conduit 14.

During operation of the cable-pulling system the cable 36 is inserted into the assembly 96 and then secured to the birdie 12 by use of the clip 38. The birdie 12 is then inserted into one end of the conduit extension tube 116, which end is then secured to the assembly 96. The opposite end of the conduit extension tube 116 is then secured to the conduit 14 at which point the cable-pulling system is ready for operation. To institute operation, on/off valve 92 is opened to supply pressurized air to the conduit extension tube 116 through tube 94 and assembly 96. Since the birdie 12 forms an airtight seal with the interior walls of the conduit 14 the introduction of pressurized air into the region of the conduit 14 behind the birdie 12 would normally urge the birdie through the conduit. However, movement of the birdie 12 through the conduit 14 can only be accomplished by the concurrent operation of the motor 50, through valve 84 and tube 54, to permit unwinding of the cable 36 from the drum 34. Because of the use of the T-connector 78, air from the compressor is supplied simultaneously to both the conduit 14, through on/off valve 92, and to the motor 50 throuqh motor control valve 84 and tube 54. Initially, the compressed air will travel to the reqion of the conduit behind the birdie 12. Once this area is pressurized, the compressed air will flow to the motor 50, powering the motor to rotate the drum 34 and unwind the cable 36, thereby permitting movement of the birdie 12 through the conduit 14.

The velocity of the birdie 12 through the conduit 14 is therefore regulated by the action of the motor 50 spooling out cable 36 from the drum 34. This is in contrast to the prior art method in which a high-volume/low-pressure air source is used to "shoot" a birdie through a conduit in a totally uncontrolled manner. As long as the birdie 12 remains in the conduit 14 the entire air system will remain pressurized and compressed air will continue to be supplied to the motor 50. Once the birdie 12 has moved through the entire length of the conduit 14 and exits the open end of the conduit the air system immediately opens and pressurization is lost. As a result, all of the compressed air supplied by the compressor exits through the open end of the conduit 14 and no compressed air is supplied to the motor 50. In the absence of a supply of compressed air, motor 50 immediately brakes the drum 34 to prevent further unwinding of the cable 36. The immediate braking of the drum 34 serves to stop the birdie 12 as soon as it exits the open end of the conduit 14. In this manner, the birdie 12 does not exit the conduit 14 as an uncontrolled projectile with the inherent safety problems. Instead, the birdie exits the conduit 14 and is immediately stopped by the action of the motor 50 preventing further unwinding of the cable 36 from the drum 34. As such, movement of the birdie 12 through and out of the conduit 14 proceeds in a controlled and safe manner.

Once the birdie 12 has pulled the cable 32 through the entire length of conduit 14 and has exited the conduit at the end remote from the unit 10, the cable-pulling system may be used to pull the cable 32, along with telephone, electric or other utility wires, back through the conduit 14. After the birdie exits the end of the conduit 14 remote from the unit 10, motor control valve 84 is operated to shut off the supply of compressed air to the motor 50 through either tube 54 or 56. On/off valve 92 is then moved to its off position to stop the flow of compressed air to the conduit 14 through tubes 94 and 116. Pin 38 is then operated to disconnect the birdie 12 from the cable 36, which is then connected to the specific wiring to be pulled through the cable. Once the wiring is firmly secured to the cable, valve 84 is operated to supply compressed air to the motor 50 through tube 56, thereby causing the motor 50 to rotate the drum 34 so as to rewind the cable 36 thereon. As a result, the cable 36 and the wiring connected thereto are both carefully pulled through the entire length of the conduit 14. Since compressed air within the conduit 14 is not required for this operation, conduit extension tube 116 may be disconnected from the end of the conduit proximate to the unit 10 so as to permit viewing of the rewinding of the cable 36 and the pulling of the wiring back through the conduit 14. Once the wiring exits the end of the conduit proximate to the unit 10, the motor control valve 84 is operated to shut off the supply of compressed air to the motor 50, thereby stopping further movement of the drum 34 and cable 36. The wiring is then disconnected from the cable 36 and the unit 10 may be taken to the next job.

The cable pulling unit 10 was used to drive the birdie 12 through a two-inch diameter conduit of polyvinyl chloride. The conduit was 1,160 feet in length and included four 90° bends. An operating conduit air pressure of 40 psi was utilized. An air volume of 100 to 150 cfm was utilized to operate the air motor 50 and to provide a 10 to 15 cfm volume of air to the conduit. Similarly, the cable unit 10 was used to drive the birdie 12 through an 850-foot length of two-inch diameter conduit which include six 90° bends and two 45° bends. The cable pulling unit 10 was also used to drive the birdie 12 through a four inch diameter conduit of polyvinyl chloride. The conduit was 975 feet in length and included four 90° bends. An operating conduit air pressure of 20 psi was utilized. An air volume of 100 to 175 cfm was utilized to operate the air motor 50 and to provide a 10 to 50 cfm volume of air to the conduit. Similarly, the cable unit 10 was used to drive the birdie 12 through an 800-foot length of four inch diameter conduit which included five 90° bends and two 450° bends.

The construction of the birdie 12 is shown in detail in FIG. 3 and includes a rod 118 which is threaded at both ends An eye nut 120 is connected to one end of the rod 118 and provides an attachment point for the clip 38 which carries the cable 36. Located proximate to the eye nut 120 is a pair of steel washers 122 and 124 which are spaced apart by three flexible sealing discs 126, 128 and 130. The discs may be formed of any flexible, durable, fluid-impervious material, such as plastic, rubber with fiber plies, neoprene, etc. and each disc is shaped so as to conform to the interior of the conduit 14. Each of the discs, however, is formed with a different diameter. The middle disc 128 is formed with a diameter equal to the diameter of the conduit 14, the first or forward disc 126 is formed with a diameter slightly smaller than the diameter of the conduit 14 and the last or rearward disc 130 is formed with a diameter slightly larger than the diameter of the conduit 14. The discs are maintained in concentric, adjacent relationship with each other and with the washers 122 and 124, by the use of a nut 132. The end of the rod 118 remote from the eye nut 120 is similarly formed with a pair of steel washers 134 and 136 spaced by three flexible sealing discs 138, 140 and 142. Nuts 144 and 146 serve to maintain the washers 134 and 136 and discs 138, 140 and 142 in concentric, adjacent relationship with each other. The function of these two groups of sealing discs (126, 128, 130 and 138, 140, 142) is to insure that the birdie 112 creates a fluid seal such as an air seal) with the conduit 14 regardless of whether the conduit is slightly collapsed, dented or includes obstructions 148.

The diameters of respective washers 122 and 134 are greater than the diameters of washers 124 and 136. Washers 122 and 134 are each located forward of their respective discs and serve to define the smallest-diameter tubing through which the birdie 12 may move. For example, if the tubing 14 is collapsed or dented to the extent that its effective diameter is less than the diameter of washers 134 and 122, the birdie will not pass through the conduit. As such, washers 122 and 134 should be sized to correspond to the minimum possible acceptable diameter of the conduit 14. The diameter of washers 136 and 124 are smaller than respective washers 134 and 122 in order to permit their respective discs to freely bend backwardly when the birdie passes through egg-shaped or collapsed sections of conduit or over obstructions 148.

The use of the three different-sized discs insures that the birdie 12 will maintain a seal with the conduit 14 in situations where the conduit 14 has been collapsed or dented so as to create an irregular inner circumference (egg shaped) having, in some places, a diameter greater than the original diameter of the conduit 14. In these situations, the fluid seal is not lost because the larger diameter discs 130 and 142 expand to the larger diameter and maintain the seal. In addition, the use of two sets of sealing discs prevents the loss of fluid seal when the birdie 12 moves through collapsed or dented sections of conduit or over an obstruction 148. Specifically, the two sets of sealing discs each serve as back up for the other to maintain the fluid seal For example, if discs 138, 140 and 142 are unable to provide an effective fluid seal with the conduit 14 upon passing over obstruction 148, pressurization is not lost since discs 126, 128 and 130 continue to maintain the birdie's 12 seal with the conduit 14. As a result, the birdie 12 continues to travel through the conduit 14 and discs 138, 140 and 142 are moved past the collapsed or dented section of conduit or over the obstruction 148 and again resume their sealing action. The birdie's 12 fluid seal with the conduit 14 is similarly maintained even through the seal provided by the second set of discs 126, 128 and 130 may be lost when they move through the collapsed or dented section or over the obstruction 148. While either set of discs may, at any time, fail to provide an effective seal, the other set of discs will serve as a temporary back-up to maintain the seal between the birdie 12 and the conduit 14.

It will readily be appreciated that each set of sealing discs may contain more than three individual discs and that the discs of a set may be formed of different materials. In addition, should the birdie 12 encounter an obstruction or collapsed section of conduit 14 which prevents its passage, pressure build up in the system will register on the pressure gauge 112 of unit 10 and eventually trigger air-pressure escape valve 114, to bleed off pressure so as to prevent any dangerous pressure build-up.

Referring now to FIGS. 4–6 the cable pulling system of the present invention may be mounted on a vehicle, such as the vehicle shown in FIG. 4 and indicated generally by the reference numeral 150. Specifically, the portable unit 10 described above and modified so as not to include the pressurized air/cable junction assembly 96 may be mounted on the vehicle 150, having a conduit extension tube 152 which corresponds to conduit extension tube 116 of unit 10, a cable 154 which corresponds to cable 36 of unit 10 and a cable-guide puley 156 which corresponds to pulley 110 of unit 10. Of course, an air compressor of the type described above is still required and it is preferable that the compressor be mounted on the vehicle 150. The vehicle-mounted unit 150 may be used, for example, for moving the cable 154 through an underground conduit 158 having one end which opens into an underground room 160, access to the room being through a manhole opening 162. The vehicle-mounted unit 150 is particularly desirable in this type of application in view of the difficulty in moving the portable unit 10 through the manhole opening 162 and into the underground room 160. With the vehicle-mounted unit 150, the rear of the vehicle, from which the cable 154 and conduit extension tube 152 extend, may be located directly above the manhole opening 162 with the cable 154 and tube 152 extending down into the room 160. Additional pulleys and rigging 164 may be attached to the walls of the room 160 and used to properly position the cable 154 with respect to the open end of the conduit 158.

Further, the pneumatic motor 50 of the portable unit 10 may be replaced by a conventional mechanical, electric or hydraulic winch which includes a drum and a supply of cable, such as those available from the Braden Winch Company of Broken Arrow, Okla. The winch must include a certain degree of resistance to spool out of cable, such that the winch will not allow pay out of cable until a resistance of approximately 10 to 15 lbs. is overcome. Utilizing a winch having a predetermined amount of resistance or drag to pay out of cable in connection with the low-volume/high pressure compressed air cable pulling system described above, results in the controlled movement of the birdie 12 through the conduit at a low rate of speed, typically 240 ft/mn. As described above, the compressor supplies pressurized air to the region of the conduit behind the birdie until a threshold pressure is established, a pressure sufficient to overcome the backward drag or resistance of the winch, at which point the birdie begins movement through the conduit. Once the winch resistance is overcome the low-volume/high-pressure compressed air supply causes the birdie to move through the conduit at a controlled low rate of speed.

As the birdie exits the opposite end of the conduit pressurization in the conduit is lost, and since there is no longer any forward pressure exerted on the birdie there is no force to counteract the backward drag or resistance of the winch. As a result, the winch operates to immediately stop pay out of cable, therefore immediately stopping further forward movement of the birdie. In this manner, the birdie is prevented from exiting the conduit as an uncontrolled trajectory. Further, movement of the birdie throuqh the conduit may be stopped at any point alonq the conduit by simply stopping the supply of compressed air to the conduit. This permits the incorporation of a "deadman" type safety feature Specifically, the controls for the compressor can be adapted to supply air to the conduit only in response to the constant operation of a particular lever or switch by an operator. For example, should the operator release the lever or switch it will immediately return to a closed position thereby stopping the supply of compressed air. Alternatively, a similar mechanism could be incorporated in the winch.

It will be readily appreciated, however, that an assembly similar to the pressurized air/cable junction assembly 96 is required in order to introduce both the pressurized air from tube 152 and the cable 154 into the conduit 158. This is accomplished by use of either an airtight chute indicated generally in FIG. 4 by the reference numeral 166 or by an adaptor assembly shown in FIGS. 7-9 and described in detail below.

Chute 166 is connected to the open end of the conduit 158 and includes an air inlet 168 which is connected to tube 152 to supply pressurized air and a cable inlet 170 which provides an airtight opening through which the cable 154 may enter the conduit 158. The construction of the chute 166 may take many different forms for various applications, the specific requirements being that the chute be firmly secured to the open end of the conduit 158 so as not to "blow out" upon the introduction of compressed air and that the chute include airtight openings permitting entry of both the cable 152 and the compressed air. Referring now to FIG. 5, one form of airtight chute is indicated generally by the reference numeral 172 and is specifically well-suited for applications in which the open end of a conduit 174 is flush with a concrete wall 176. Chute 172 includes a tube 178 having a diameter slightly less than the diameter of the conduit 174 so that one end of the tube may be inserted therein. The opposite end of the tube is threaded and adapted to receive a cap 180 which includes an airtight cable guide 182 Guide 182 is formed so that movement of the cable 154 therethrough is accomplished without loss of compressed air so that the interior of the chute can remain pressurized. Chute 172 also includes an air inlet connector 184 to which one end of the conduit extension tube 152 is secured, as well as an air-pressure escape valve 186 which serves as a safety feature by preventing extreme pressure build-up in the system.

The tube 178 is held in place within the conduit 174 and a fluid seal is effected therebetween through the use of a seal 188, such as a rubber qasket, which is disposed between the exterior portion of the tube 178 and the open end of the conduit 174. A washer 190 is placed over the seal 188 and a support bracket 192 contacts the washer 190 to urge the gasket 188 into sealing engagement with the open end of the conduit 174. Bracket 192 is secured to the wall 176 by the use of bolts 194 and 196 which are received in expanding plugs 198 and 200 set in the wall 176.

Referring now to FIG. 6, a chute indicated generally by the reference numeral 202 is particularly well-suited for use in situations where the open end of a conduit 204 extends outwardly from a wall and is freely accessible. In this situation, a collar 206 is cemented or otherwise secured to the end of the conduit 204 and formed with an internally threaded opening 208 to which chute 202 is secured. Specifically, the chute 202 is formed from a tube 210 having external threads at both ends thereof for attachment of one end of the tube to the collar 206 and the other end of the tube to a cap 212. Cap 212 includes an airtight cable guide 214 which permits movement of the cable 154 into the conduit 204 without loss of compressed air. Chute 202 is also formed with an air-inlet connector 216 which receives the conduit extension tube 152 and permits compressed air to enter the conduit 204. The chute 202 also includes an air pressure escape valve 218 which serves as a safety feature by preventing extreme pressure build-up in the system.

Use of either of the chutes 172 or 202, requires that the chute be secured to the conduit as described above. Respective caps 180 and 214 are then screwed off and the cable 154 (without the birdie 12 attached thereto) is threaded through respective guides 182 and 216. The birdie 12 may then be connected to the cable 154 and placed in the open end of respective tubes 178 and 210. The birdie 12 should be pushed past the respective air inlet connectors 184 and 216 by use of a suitable rod, and may even be pushed into respective conduits 174 and 204. Once the birdie is appropriately situated within either respective tubes 174 or 204 or respective conduits 174 or 204, respective caps 180 and 214 are replaced and the cable pulling system may then be operated in the same manner as described for unit 10 to move the birdie 12 through either conduit 174 or 204, pulling the cable 154 therethrough. The chutes 172 and 202 may be removed from the end of the conduit 152 during the re winding of the cable 154 and the pulling of wiring back through the conduit 152.

Figure 7:
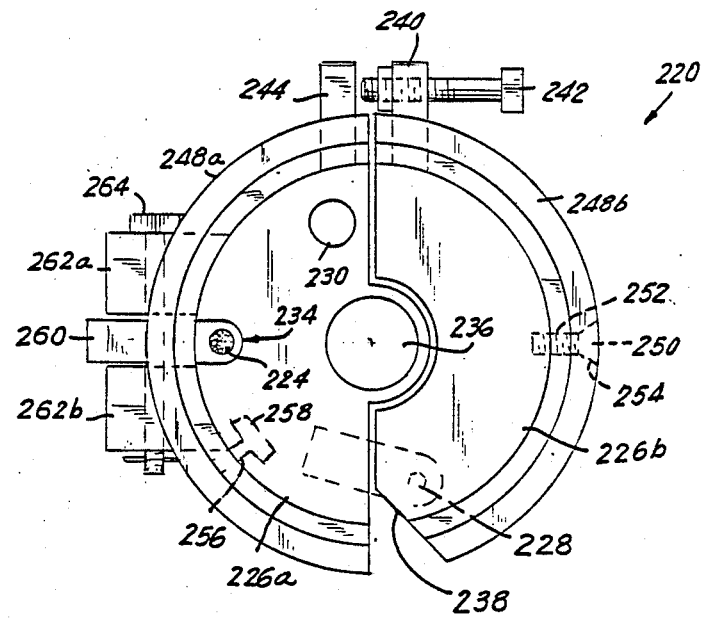
FIG. 7 is a front elevation of the adaptor usable with the cable pulling system of the present invention showing the internal face of the adaptor.
Figure 8:
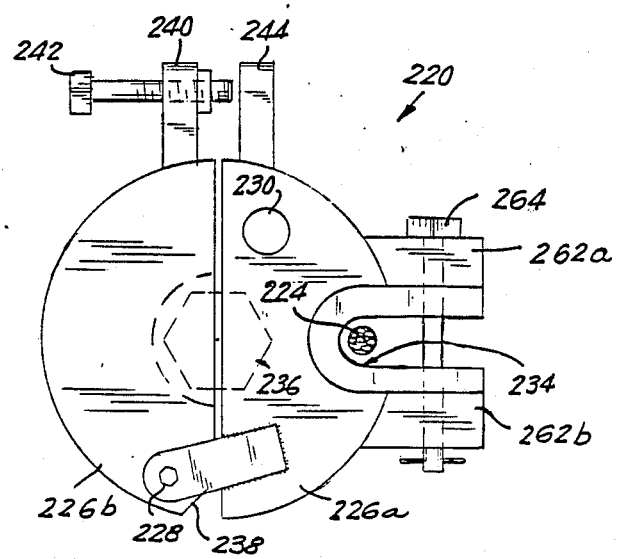
FIG. 8 is a rear elevation of the adaptor showing the external face of the adaptor.
Figure 9:
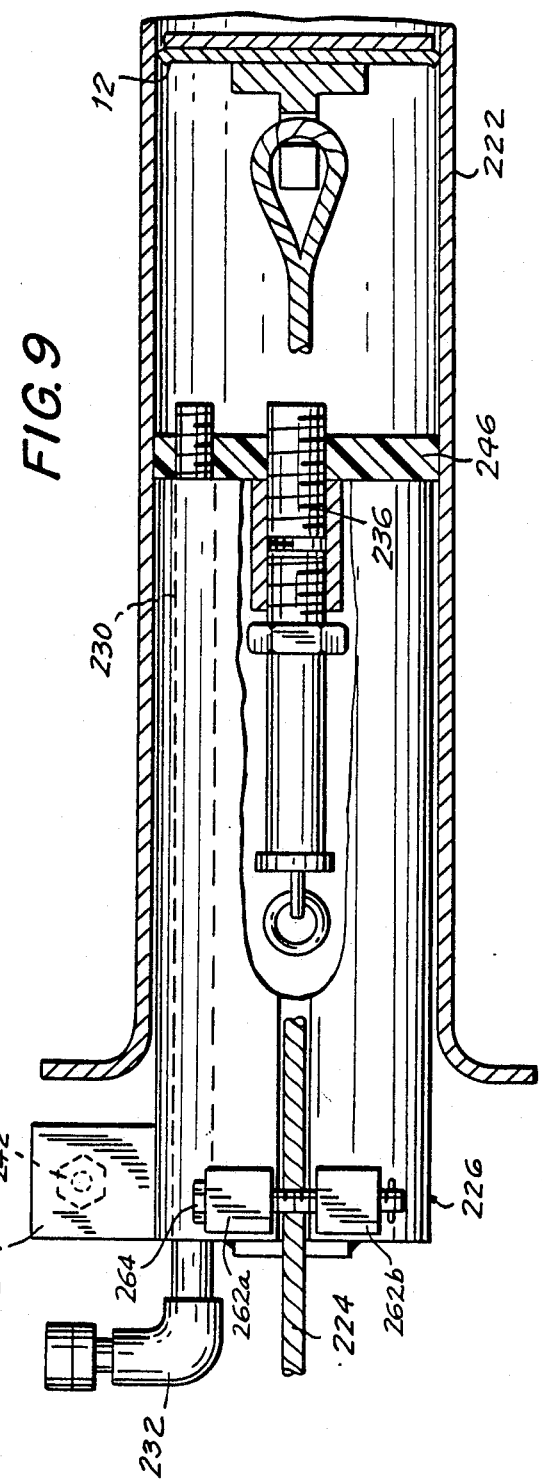
FIG. 9 is a sectional side elevation of the adaptor shown in conjunction with a section of conduit.

Referrinq now to FIGS. 7-9 the cable-pulling system of the present invention may be practiced with an adaptor, indicated generally by the reference numeral 220. The adaptor 220 is placed in one end of a conduit 222 and provides a supply of compressed air and cable or winch line 224 to that end of the conduit 222 in a manner similar to the airtight chutes shown in FIGS. 4-6. The adaptor 220, however, has the advantage of being capable of use with conduits of different diameter by simple adjustment.

The adaptor 220 includes a cylindrically shaped split plug formed of two pieces 226a and 226b which are generally semicircular in cross section and pivotally connected to one another at one end by a pivot pin-and-hinge assembly 228. Piece 226a of the split plug is formed with an air duct 230 extending throuqh its length and adapted at one end to be connected to a supply of compressed air through an appropriate connector 232. The opposite end of the duct 230 is adapted to supply air to the interior region of conduit 222. Piece 226a also includes a groove 234 which extends along the circumference of the piece from one end to the other. The groove 234 is adapted to receive a length of cable 224 and to permit entry of the cable 224 into the interior region of the conduit 222. The center of each of the pieces 226a and 226b are formed so as to receive and hold an air pressure relief valve 236 which serves as a safety feature by preventing extreme pressure build up in the system.

Plug piece 226b is formed with a cutout portion 238 and a post 240 which extends from the piece 226b opposite the pivot pin and hinge assembly 228 and which rotatably receives a plug expanding bolt 242. Upon rotation, bolt 242 bears aqainst a stop 244, which extends from piece 226a, causing piece 226b to pivot around pin 228a thereby expanding the size of the plug 226. Cutout 238 permits pivoting of piece 226b around the pivot pin 228. The bolt 242 is used to expand the plug 226 once it is placed within the conduit 222 in order to secure the plug 226 in the conduit 222 and to aid in the creation of an airtight seal between the conduit 222 and the plug 226.

The end of the plug 222 which is received in the conduit includes a disc-shaped seal 246 formed, for example, of neopreme, rubber, fiber or nylon The seal 246 fits over the internal face of the plug 226 and includes openings to permit communication of cable 224, air duct 230 and air pressure relief valve 236 from the plug 226 into the conduit 222. The diameter of the seal 246 should be slightly larger than the effective diameter of the internal face of the plug 226. In this manner, an airtight seal can be created between the interior region of the conduit 222 and the plug 226.

The diameter of the plug 226 can be varied to accommodate different sized conduits 222. For example, the plug 226 which includes pieces 226a and 226b can be initially formed with a diameter of slightly less than 3", which is the desired diameter for use with a standard 3" diameter conduit In use, the plug 226 (including air seal 246) is inserted into the conduit 222 and then bolt 242 is rotated to expand the pluq 226 to lock it in place within the conduit, with the seal 246 providnng an airtight seal between the plug 226 and the interior region of the conduit 222. This 3" plug 226 can be readily adapted for use with 4" and 5" diameter conduit by securing detachable dies to the plug. For example, as seen in FIG. 7 a pair of C-shaped dies 248a and 248b each having an axial thickness of slightly less than ½" can be detachably affixed to the plug 226a and 226b to increase the overall diameter of the plug 226 by approximately 1". As modified the plug 226 may be readily used with 4" diameter conduit. Similarly dies 248a and 248b could each be formed with an axial thickness of slightly less than 1" so as to increase the overall diameter of the plug 226 by 2" for use with 5" diameter conduit.

Die 248b is connected to split plug piece 226b through the use of one or more bolts 250 which extend through the die 248b and are received in threaded openings 252 formed in the external surface of piece 226b. The die 248b is formed with counter sink openings 254 so that the head of the bolts 250 will be located entirely within the die. This is to prevent damage to the interior of the conduit 222 and to perit the creation of an effective air seal between the plug 226 and the conduit 222.

Die 248a is connected to split plug 226a through the use of one or more keyhole shaped openings 256 formed in the external surface of the plug piece 226a and correspondingly shaped keys or pins 258 extending from the internal surface of the die 248a. In this manner, the die 248a may be attached to the plug piece 226a by inserting the pins 258 into the keyhole openings 256 and then sliding the die 248a forward into its in-use position in which the pins 258 are locked in the openings 256. In order to keep the die 248a in its in-use position on the plug piece 226a, die 248a includes a tab 260 formed with a cylindrical opening extendinq therethrough, and plug piece 226a includes a pair of bosses 262a and 262b which are also formed with a cylindrical openinq extending therethrough. When the die 248a is in its in use position on the plug 226a, the tab 260 is located between bosses 262a and 262b. The die 248a may then be kept in its in-use position by simply insertinq a cotter pin 264 through the cylindrical openings formed in the tab 260 and bosses 262. This locking arrangement is preferred for die 248a (as opposed to the bolts 250 used for die 248b) since it permits the quick removal of the die 248a (simply remove the cotter pin 264 and slide the die 248a backwards and off the plug piece 226a) thereby allowing access to the groove 234 on plug piece 226a within which cable 224 travels. Other mechanisms capable of quick release may be used in place of the tabs 260, 262a and 262b and pin 264, such as a spring loaded thumb latch.

It will be readily appreciated that larger sized seals 246 are required for use with the larger sized plug 226 diameters created by the use of dies 248. Similarly, different sized birdies 12 would also be required for different sized conduits. The use of dies to enlarge the outer diameter of a plug requires the use of different sizes of birdies and seals conforming to the plug interior. While the enlargement of the outer diameter of the plug does not in and of itself require the use of different sizes of birdies and seals, larger diameter plugs are used in connection with larger diameter conduits and larger diameter conduits require larger diameter birdie 12 and larger diameter seals 246 as the birdies and seals must contact the inner walls of the larger diameter conduits.

The adaptor 220 is particularly well suited for use with a compressor capable of supplying high-pressure/low-volume compressed air and a standard winch including a supply of cable and having a certain degree of resistance to pay out of the cable. In addition, cable can be safely moved through various different sized conduits by using the adaptor 220 with a supply of different sized dies 248, birdies 12 and seals 246 and a suitable compressor and winch. For example, for a particular diameter conduit 222 an appropriate sized birdie 12 is attached to the cable 224 supply from the winch and the birdie is then placed in one end of the conduit 222. A portion of the cable 224 is placed in the cable groove 234 formed in plug piece 226a and appropriate sized dies 248 are secured to the plug 226. An appropriate sized seal 246 is placed over the internal face of the plug 226 and the plug is inserted into the conduit 222. Bolt 242 is then rotated so that it bears against stop 244 causing the plug 226 to expand and eventually lock itself within the conduit 222. The output of the compressor is then coupled to the connector 232 and, at this point, the cable pulling system is ready to be operated to move the birdie through the conduit.

The birdie 12 is moved through the conduit 222 by supplying high pressure/low volume compressed air through the duct 230 of the adaptor and into the region of the conduit 222 behind the birdie 12. Once the resistance of the winch is overcome, the birdie 12 moves through the conduit 222 at a relatively low rate of speed, pulling the cable 224 therethrough. As the birdie 12 exits the opposite end of the conduit 222, air pressure in the conduit is lost and there is no longer any force acting on the birdie 12 to overcome the resistance of the winch to pay out of the cable 224. Accordingly, the resistance of the winch serves to immediately halt payout of cable 224 and corresponding movement of the birdie 12.

Figure 10:
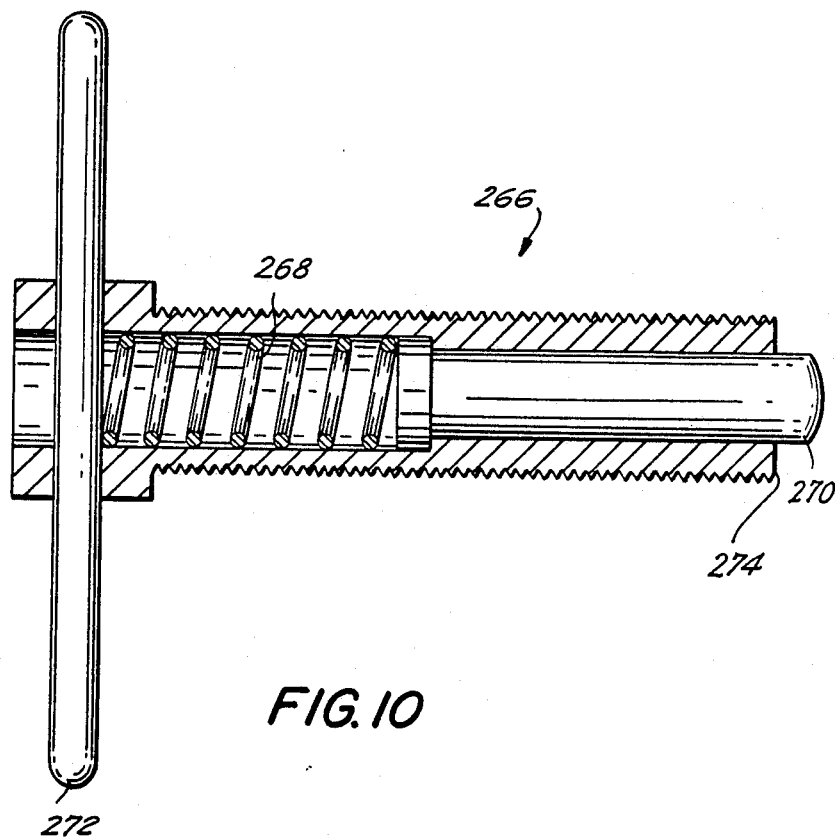
FIG. 10 is a second embodiment of the plug expanding bolt which utilizes a torque mechanism.

Referring now to FIG. 10, the bolt 242 may be replaced with a bolt 266 which includes a torque mechanism. Bolt 266 includes a 160 lb working load spring 268 which bears against a pin 270. As the T shaped handle 272 of the bolt 277 is turned to tighten the split plug 226 in place, the torque on the spring 268 builds up, recessing the pin 270. At a full 160 lb pressure, the pin 270 is mechanically overriden by the main body 274 of the bolt 266. At this point the plug 226 is locked in place within the conduit 14. If the spring 268 breaks under operating load there is no safety problem since the body 274 acts as a mechanical override.

Typically, for 3" to 6" diameter conduit a relatively high air pressure of 10 to 50 lbs is utilized in conjunction with a relatively low air volume of 25 to 50 cubic feet per minute to move the birdie 12 through the conduit at a speed of 100 to 200 feet per minute.

The adaptor 220 was used with an Ingersol Rand compressor capable of supplying high pressure/low-volume compressed air and a hydraulic winch (Braden Winch Company, Broken Arrow, Okla.) having a supply of ½ inch diameter cable and a 10 to 15 lbs drag or resistance to the payout of cable, to drive the birdie 12 through a five inch diameter polyvinylchloride conduit. The conduit was 875 feet in length and included three 90° bends. An operating conduit air pressure of 15 to 20 psi and a volume of 25 to 50 cfm was utilized. In addition to pulling the cable through the conduit, the birdie also pushed standing water and mud from one end of the conduit to the other. The above arrangement was also used to drive the birdie through a five-inch diameter 805-foot length of conduit having four 90° bends. Again, the birdie pushed standing water and mud through the entire length of the conduit.

The adaptor 220, compressor and winch described above was used to drive the birdie 12 through a six-inch diameter polyvinylchloride conduit. Specifically, the birdie was driven through a 990-foot length of six inch diameter conduit having two 90° bends and four 45° bends at an operating conduit air pressure of 15 to 20 psi and an air volume of 25 to 50 cfm. The conduit started with a 90° bend, went straight for 600 feet, dropped under a canal and back up with four 45° bends (totaling 150 feet), then proceeded another 240 feet to the second and last 90° bend, bringing it six inches above ground level. This conduit had been uncapped for six months, was obstructed by mud and water and was not cleared prior to use of the air adptor 220. The adaptor was secured to one open end of the conduit and was ready for use in approximately twelve minutes. It then took approximately five and-one-half minutes to drive the birdie 12 through the conduit. As it moved through the conduit the birdie 12 pushed a twelve to eighteen inch head of mud and water and also (simultaneously) pulled a ½ inch diameter steel cable through the cleared conduit In another situation the adaptor 220 was used to drive the birdie 12 through a 950-foot length of six inch diameter conduit having four 90° bends. An operating conduit air pressure of 12 to 15 psi and a volume of 25 to 50 cfm was utilized.

As will be readily apparent to those skilled in the art, the invention may be used in other specific forms or for other purposes without departing from its spirit or central characteristics. The present embodiments are therefore to be considered as illustrative and not restrictive, the scope of the invention being indicated by the claims rather than by the foregoing description, and all embodiments which come within the range of equivalence of the claims are intended to be embraced.

What is claimed is:

1. Apparatus for providing cable and pressurized fluid to a hollow conduit defining an interior region comprising:
   (A) a plug shaped to conform to the interior region of the conduit, said plug having an internal face which is placed wholly with the conduit and an external face which remains outside the conduit, said plug including means for expanding the size of said plug so as to secure it in place within the conduit;
   (B) sealing means, adjacent the internal face of said plug for providing a fluid seal between said plug and the interior region of the conduit, including a gasket means disposed between an exterior portion of said plug and an open end portion of the conduit, and support means to position and maintain said gasket means in sealing engagement with the open end portion of the conduit;
   (C) an air duct extending through said plug from the external face to the internal face and through said sealing means to permit the supply of pressurized fluid to the interior region of the conduit; and (D) a cable groove extending through said plug from the external face to the internal face and through said sealing means to permit the supply of cable to the interior region of the conduit.

2. Apparatus as in claim 1 which further includes attachment means which may be detachably affixed to said plug to increase the size of said plug so that it conforms to the interior region of different sized conduits.

3. Apparatus as in claim 2 in which said pluq is formed of two pieces which are hinged together and said means for expandinq the size of said plug includes means for separating the two pieces of said plug.

4. Apparatus as in claim 3 in which said attachment means are formed of two pieces which are adapted to be detachably affixed to the two pieces of the plug.

5. Apparatus as in claim 1 in which said plug further includes means for preventing excessive build up of pressure in the interior region of the conduit.

6. Apparatus as in claim 1 in which said plug is formed of two pieces which are hinged together and said means for expanding the size of said plug include means for separating the two pieces of said plug.

7. Apparatus as in claim 1 wherein said expanding means comprises means for securing said plug in the conduit.

8. Apparatus for providing cable and pressurized fluid to a hollow conduit defining an interior region comprising:

(A) a plug shaped to conform to the interior region of the conduit, said plug having an internal face which is placed wholly with the conduit and an external face which remains outside the conduit, said plug including means for expanding the size of said plug so as to secure it in place within the conduit;

(B) sealing means, adjacent the internal face of said plug for providing a fluid seal between said plug and the interior region of the conduit;

(C) an air duct extending through said plug from the external face to the internal face and through said sealing means to permit the supply of pressurized fluid to the interior region of the conduit; and (D) a cable groove extending through said plug from the external face to the internal face and through said sealing means to permit the supply of cable to the interior region of the conduit.

9. The apparatus as in claim 8 wherein said means for expanding the size of said plug expands the size of the external face of said plug, and the internal and external faces of said plug are rigidly connected for movement as a unit so that the size of the internal face of said plug is substantially equally expanded.

10. The apparatus of claim 9 wherein the internal and external faces of said plug are, along the longitudinal axis, of integral one-piece rigid construction.

11. Apparatus as in claim 8 which further includes attachment means which may be detachably affixed to said plug to increase the size of said plug so that it conforms to the interior region of different sized conduits.

12. Apparatus as in claim 11 in which said plug is formed of two pieces which are hinged together and said means for expanding the size of said plug includes means for separating the two pieces of said plug.

13. Apparatus as in claim 12 in which said attachment means are formed of two pieces which are adapted to be detachably affixed to the two pieces of said plug.

14. Apparatus as in claim 8 in which said plug further includes means for preventing excessive build up of pressure in the interior region of the conduit.

15. Apparatus as in claim 8 in which said plug is formed of two pieces which are hinged together and said means for expanding the size of said plug include means for separating the two pieces of said plug.

16. Apparatus as in claim 8 wherein said expanding means comprises means for securing said plug in the conduit.

* * * * *